Aug. 4, 1970     T. H. RAMSEY, JR     3,523,039
TRANSITION METAL OXIDE BODIES HAVING SELECTIVELY FORMED
CONDUCTIVE OR METALLIC PORTIONS AND
METHODS OF MAKING SAME

Original Filed Dec. 31, 1964     2 Sheets-Sheet 1

INVENTOR
THOMAS H. RAMSEY, JR.
BY
ATTORNEY

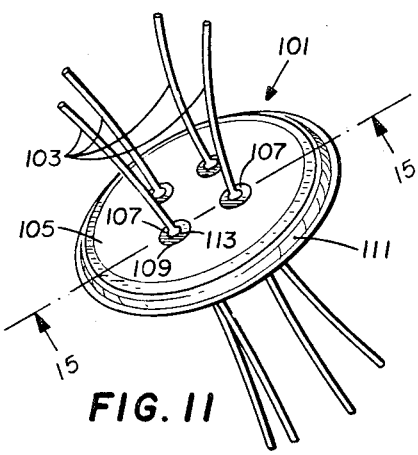
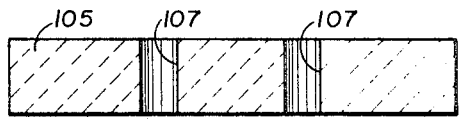
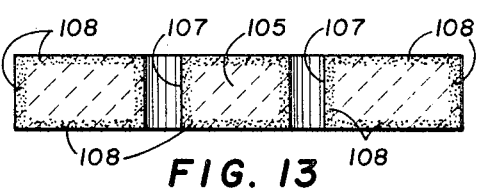
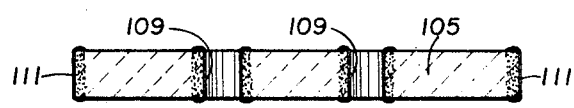
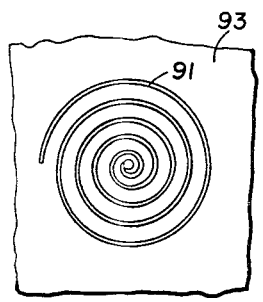
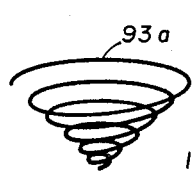
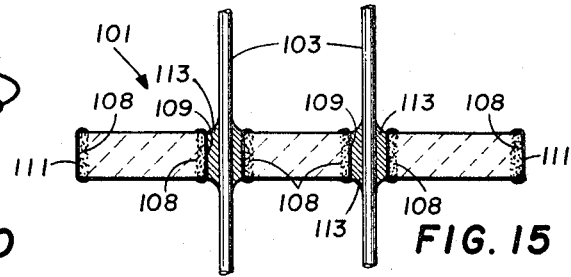
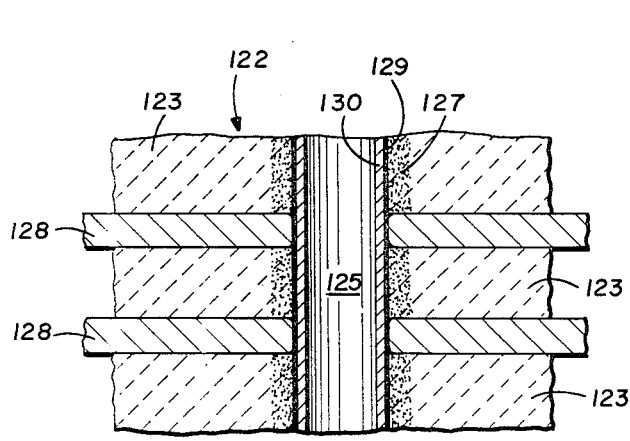
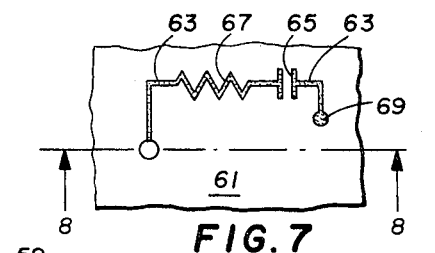
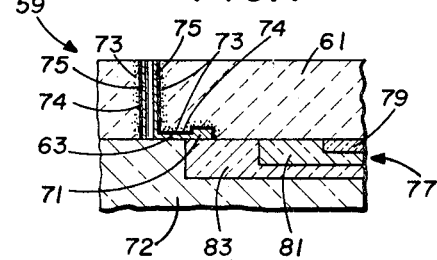

United States Patent Office 3,523,039
Patented Aug. 4, 1970

3,523,039
TRANSITION METAL OXIDE BODIES HAVING SELECTIVELY FORMED CONDUCTIVE OR METALLIC PORTIONS AND METHODS OF MAKING SAME
Thomas H. Ramsey, Jr., Dallas, Tex., assignor to Texas Instruments Incorporated, Dallas, Tex., a corporation of Delaware
Continuation of application Ser. No. 422,584, Dec. 31, 1964. This application July 29, 1968, Ser. No. 749,919
Int. Cl. H05k 1/16
U.S. Cl. 117—212
26 Claims

ABSTRACT OF THE DISCLOSURE

Disclosed is a method of treating transition metal oxide bodies to form conductive paths and the resulting article. A titanium dioxide body is subjected to the action of an electron beam in a reducing atmosphere. The beam traces out the desired pattern on the surface of the oxide body to form conductive paths within the surface. Metal may be attached by plating or otherwise to increase the conductivity of the article.

---

This application is a continuation of S.N. 422,584, filed Dec. 31, 1964, now abandoned.

This invention relates to transition metal oxide bodies which have selectively formed conductive or metallic portions and to methods of making such structure.

Copending U.S. Pat. No. 3,390,012, entitled "Dielectric Bodies with Selectively Formed Conductive or Metallic Portions, Composites Thereof with Semiconductor Material, and Methods of Making Said Bodies and Composites," filed Sept. 18, 1964, with Rolf R. Haberecht as inventor, assigned to the assignee of the present application, describes and claims an invention having utility in solving a variety of problems of the prior art. In accordance with the invention of the prior application, dielectric bodies having autogenously formed conductive or metallic portions are provided. The making of such bodies depends upon the selective reduction of dielectric material to form the relatively metallic or conductive portions. Specifically, in accordance with the prior invention, it was found that bodies of yttrium iron garnet material could be selectively reduced in such a manner that preselected regions of a body become changed in chemical structure sufficiently to make those regions relatively metallic and conductive. Moreover, it was found that variation of the magnetic properties of yttrium iron garnet material could be effected by selective reduction. It was further found that spinels, hexagonal iron oxides, and perovskite-type materials could be changed in like manner to yttrium iron garnet by localized reduction to make relatively conductive and metallic regions, as well as to change the magnetic properties of the materials in such regions.

Various methods and structures were provided by the invention of the said prior application, each depending in one way or another upon a change in the materials effected by selective reduction. For example, the prior invention provided a method for bonding or joining dielectrics to metals. As a specific example, it was noted that yttrium iron garnet could be reduced in surface regions (e.g. in a hydrogen atmosphere at about 1000° C.) to obtain a multiplicity of layers or subzones having varied characteristics. The outermost layer, where the highest degree of reduction was accomplished, was found to have a resistivity approaching or comparable to that of iron per se. The next layer was found to have a resistivity somewhat higher, for example, on the order of $10^{-4}$ ohms. The successively encountered layers or subzones, moving inwardly from the comparatively highly reduced surface layer, were found to be increasingly nonmetallic in nature. At least four such layers or subzones, in addition to the unreduced inner portion of the yttrium iron garnet body, were identified. By selectively reducing a yttrium iron garnet body to provide the various layers or subzones referred to, a transition region or joint varying in character from a quite metallic outer portion to a ceramic, nonconductive inner portion, was provided. By welding or fusing a metal to the outermost highly reduced layer or subzone, a bond was effectively provided between the dielectric body and the metal, with the layers or subzones of varying degrees of reduction serving as a transition joint between the materials.

It was further found, in accordance with the invention of the said prior application, that the degrees of reduction could be varied over relatively wide limits. Thus, it was found possible to provide a quite thin outer region, which was reduced a relatively small amount, but enough to substantially change the nature of the material to make it comparatively metallic and conductive. Such comparatively metallic and conductive regions were found to be susceptible to preferential plating with a metal, for example, to plating with nickel by electroless plating technique.

An important aspect of the prior invention concerns the selective reduction of dielectric bodies by a concentrated energy source, e.g. by an electron beam. An electron beam was found to be useable to form desired circuit patterns having extremely high resolution. Moreover, it was seen that the relatively reduced regions defining the circuit patterns could be metalized with nickel, or other metal, by electroless plating technique. Components, including inductors, as well as capacitors and resistors, were noted to be fabricable by localized reduction with a concentrated energy source such as an electron beam.

In accordance with the said prior invention, circuit boards, headers, through-plated hole interconnectors, various solid-state circuits (including composites of dielectric and semiconductor material), passive components, and various other structures all utilizing or involving relatively reduced regions autogenously formed out of a dielectric material, where provided.

The materials described and claimed in the said prior application were relatively complex and expensive. These materials included, in general, at least three chemical elements. Specifically, the prior application discloses the applicability of various yttrium iron garnet materials, hexagonal iron oxides, spinels, and perovskite-type materials to its practice.

It has now been found that transition metal oxide bodies may be selectively reduced to autogenously form comparatively conductive and metallic portions. The transition metal oxides are comparatively simple compounds and, in most instances, relatively inexpensive. For example, titanium dioxide is much less expensive than yttrium iron garnet and yet has been found superior to it for many applications involving selective reduction of bodies of the respective materials. As a further example, iron oxide is cheaper than yttrium iron garnet, but in various applications, particularly where it is desired to change magnetic properties of the material by selective reduction technique, iron oxide bodies have been found to be useable in place of yttrium iron garnet bodies.

In general, essentially all of the structures described in the said prior application may be made by the selective reduction of transition metal oxides in accordance with the present invention. Accordingly, it is seen that the present invention consists, in essence, of the finding that transition metal oxide bodies may be selectively reduced to form comparatively metallic and conductive portions. Also, a variety of structures similar to those described in the said prior application may be made by such selective reduction, together with, in some cases, plating or otherwise joining of metal to the selectively reduced portions.

Accordingly, the object of the present invention is to provide an improvement to the invention of the said prior application. The improvement consists of extending the applicable materials involved in the prior invention to include a variety of materials having certain properties differing in various respects from the properties of the prior materials. The extension of versatility and adaptability of selective reduction technique to provide structures for a wider range of desired uses evolves from the foregoing object.

It is a further object to extend the practice of the invention of the said prior application to cover materials which are relatively inexpensive and comparatively easy to obtain.

The present invention provides a process for preparing a dielectric body of a transition metal oxide to have a comparatively conductive portion. The process comprises selectively reducing a zone of a transition metal oxide body so that said zone becomes comparatively conductive.

In a preferred embodiment, the process of preparing a transition metal oxide body with a comparatively conductive portion involves exposing a zone of the body to a localized concentrated energy source while the zone is in a reducing environment. An electron beam is the preferred concentrated energy source. The beam, or other concentrated energy source, is preferably moved with respect to the transition metal oxide body to form a conductive portion in a predetermined pattern.

An embodiment of the present invention includes a subsequent step of adhering a conductor to comparatively metallic, conductive zones formed by selective reduction of a transition metal oxide body. Preferably, the conductor is adhered by plating, but it may be adhered by fusion.

The structural aspects of the present invention further provide a transition metal oxide body comprising a dielectric portion having a comparatively conductive zone integral with and autogenously formed from said dielectric portion. In a preferred embodiment, a conductor is firmly adhered to the autogenously formed conductive zone.

In a preferred embodiment, a circuit board is provided which comprises a dielectric substrate of a transition metal oxide having relatively conductive circuit portions therein autogenously formed by reduction of the transition metal oxide substrate. Various circuit patterns, including such passive components as may be desired, are provided in the substrate. The circuit patterns and passive components are autogenously formed by selective reduction.

The present invention further provides a header made primarily of a transition metal oxide. The transition metal oxide header includes a transition metal oxide body having comparatively conductive zones formed thereon by reduction of portions only of the body. The comparatively conductive zones carry metal plating. At least a part of the metal-plated comparatively-conductive zones pass through the body.

An interconnector and support means for spaced-apart conductors is further provided by the present invention. This structure includes a transition metal oxide spacer between a pair of spaced-apart conductors. The spacer has an autogenously formed reduced portion that extends from close proximity with one conductor to close proximity with the other conductor. The autogenously formed reduced portion has metal plating adhered to it. The metal plating is also adhered to each of the conductors.

In accordance with the present invention, an inductor is also provided. The inductor comprises a substrate of a transition metal oxide having a conductive pattern autogenously formed therein by selective reduction. The pattern is generally of spiral configuration, defining an inductor on the substrate. Preferably a metal is adhered to the inductor pattern.

The present invention further provides a solid-state integrated composite circuit comprising a dielectric material of a transition metal oxide having circuitry in regions thereof autogenously formed by selective reduction of a part of the dielectric material and further comprising a semiconductor chip carrying circuitry operatively associated with the autogenously formed circuitry in the dielectric material. The transition metal oxide dielectric material and the semiconductor chip are joined together into an integral, composite structure.

Titanium dioxide is the preferred material for all structures and practice of the present invention except for those involving inductors and alteration of magnetic properties. For such exceptions, iron oxide is the preferred material.

For a more complete understanding of the present invention and for further objects and advantages thereof, reference may now be had to the following description taken in conjunction with the accompanying drawings in which.

Figure 1:
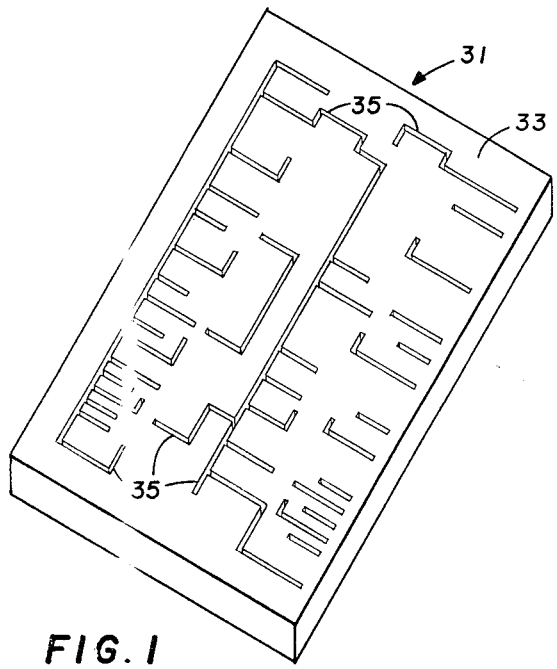
FIG. 1 is a perspective of a transition metal oxide circuit board in accordance with the present invention.
Figure 3:
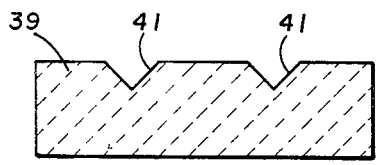
Figure 4:
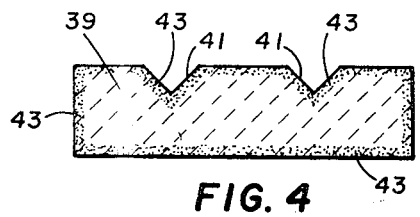
Figure 6:
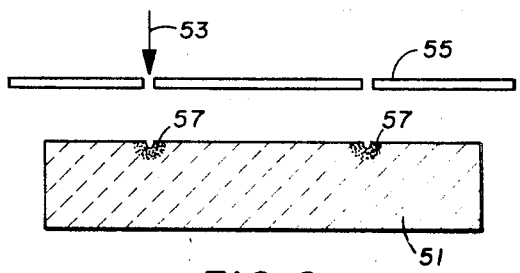
Figure 5:
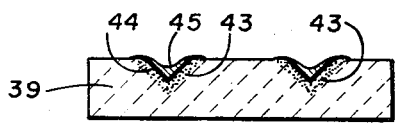

FIGS. 3, 4 and 5 sequentially illustrate the steps for making a circuit board of the nature of FIG. 1, or of making other transition metal oxide structure with selectively formed conductive paths thereon, in accordance with an embodiment of this invention;

FIG. 6 schematically illustrates a specific method, utilizing an electron beam, for forming circuit patterns or components on a transition metal oxide substrate in accordance with the present invention;

FIG. 7 is a fragmentary plan view of a composite body which includes a dielectric layer of a transition metal oxide joined to a semiconductor layer. Circuitry, including passive components, is schematically illustrated in the upper surface region of the transition metal oxide layer;

FIG. 8 is a sectional view taken along 8—8 of FIG. 7. It illustrates electrical interconnection between circuitry carried in the transition metal oxide layer and a transistor formed in the underlying semiconductor layer;

FIG. 9 is a fragmentary plan view, illustrating an inductor formed in a transition metal oxide substrate, in accordance with the present invention;

FIG. 10 is a highly schematic, pictorial view illustrating the effective circuit path of the inductor of FIG. 9;

FIG. 11 is a perspective view of a sealing header for an electrical device, and illustrating feed-through conductors passing through the header;

FIGS. 12, 13, 14, and 15 are sectional views sequentially illustrating the various stages of processing the header of FIG. 11, FIG. 15 being a section through the finished header along 15—15 of FIG. 11, but to a larger scale than that of FIG. 11; and FIG. 16 is a fragmentary sectional view taken through a through-plated hole interconnector, wherein two conductive members, separated by a dielectric, are interconnected.

Referring now to FIG. 1, therein is illustrated a circuit board of the so-called "printed circuit" type, which is made in accordance with an aspect of the present invention. The circuit board, indicated generally at the numeral 31, includes the dielectric substrate 33, made of a transition metal oxide, and the conductive paths 35 in the upper face of substrate 33. These paths may take a multiplicity of patterns, that of FIG. 1 being merely illustrative. The paths 35 are preferably plated with a metal on reduced surface zones autogenously formed in accordance with the present invention, but under some conditions the plating may be omitted and the comparatively conductive surface zones themselves used as the conductive paths.

Figure 2:
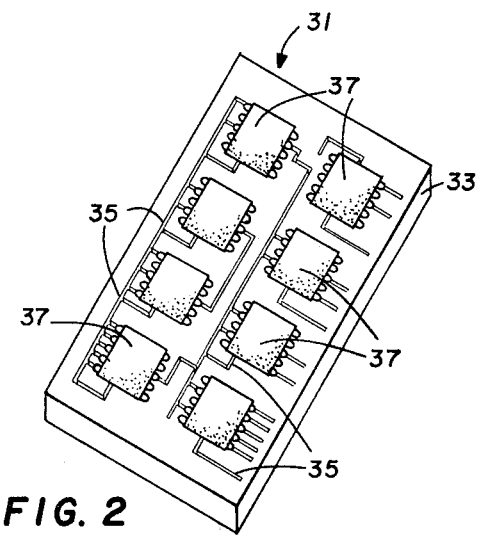
FIG. 2 illustrates a use of the structure of FIG. 1, schematically showing the electrical interconnection of various semiconductor network packages to the structure of FIG. 1.

While many usages of circuit boards of the general nature of 31 are believed evident, the simplified drawing of FIG. 2 illustrates a specific use of the board 31. Therein semiconductor network packages 37 are shown affixed interconnected in desired circuit position on the board 31, the leads from the package being welded to the selectively formed conductive paths 35. If desired, soldering or other bonding means might be used, but welding is preferred since a stronger bond is obtained. With titanium dioxide as the material of construction of the circuit board substrate 33, weld strengths ranging to about 50,000 p.s.i. are obtainable. This provides a considerably stronger bond than can be obtained when joining structure to conventional thin metal film circuit paths and other prior art circuit board structure. It should be noted that the ability of an in situ circuit board, such as board 31 of FIGS. 1 and 2, to withstand high temperatures and thus permit welding of various structure to the in situ circuit paths is an important feature. As an example, titanium dioxide in situ circuit boards can withstand temperatures of around 300° C. for sustained periods.

The conductive paths 35 of FIG. 1 are made in situ by various techniques involving localized reduction of surface zones of the body. One of these techniques involves selectively reducing surface zones of the body and then cutting away or otherwise removing the reduced surface zones in regions where insulation is desired in order to leave only the selective paths of reduction in a desired circuit pattern. Another approach involves the selective, localized reduction by means of a concentrated energy source of surface zones of a transition metal oxide body in accordance with a desired, predetermined pattern. Manufacture of an item of the general nature illustrated in FIG. 1 in accordance with both concepts or approaches will be discussed herebelow.

Referring to FIG. 3, therein is shown a cross-sectional view of a substrate or sheet 39 of a reducible transition metal oxide, for example, titanium dioxide, which is scribed with a sharp tool or die to form V-shaped depressions 41 in the upper surface thereof. The scribing is conducted to conform to a desired circuit pattern. After the scribing is completed, the transition metal oxide sheet 39 is placed in an oven and heated in a hydrogen atmosphere, for example, at about 700° C. for about two minutes. Alternatively, other means of reduction may be used, for example, the transition metal oxide sheet 39 may be placed under vacuum conditions, such as a pressure of $10^{-3}$ mm. at about 1000° C., or exposed to an inert gas at an elevated temperature, for example, exposure to argon, helium, etc. at about 800°–1000° C., for several minutes. Partial reduction of the surface zones adjacent all exposed surface areas occurs. The resulting transition metal oxide sheet, now having external, partially-reduced, comparatively conductive, metallic surface zones, is cooled and removed from the oven. Its appearance is schematically illustrated in FIG. 4, wherein the transition metal oxide sheet 39 is shown to have partially-reduced zones 43 extending inwardly a short distance from its exposed surfaces. By a sharp cutting tool, by sandblasting, or other suitable means, the sides, bottom, and top are next removed from sheet 39 to leave only those zones 43 extending inwardly from the remaining portions of the scribed depressions 41. Thereafter, the sheet 39 is plated by electroless plating technique with an appropriate metal, for example, it may be plated with copper from a standard copper plating solution for about 60 minutes, at a plating temperature of approximately 25° C. The resulting plated product is schematically illustrated in FIG. 5 wherein a layer of copper, identified by the numeral 44, is shown to be bonded to reduced surface zones 43 bounding the scribed depressions 41. It is preferred to adhere nickel to the outermost surface of the conductive path 35 to facilitate welding. Therefore, the body is immersed in an electroless nickel plating solution to provide a coating of nickel. Standard nickel plating solutions and electroless plating techniques are applicable to this plating step. The resulting product, as is shown in FIG. 5, has an outer coat of nickel 45 bonded to and extending from the layer of copper plating 44. The foregoing technique produces a board of the nature of that illustrated at 31 in FIG. 1, including plated conductive paths thereon.

A circuit, including a multiplicity of electrical circuit components, may be made or formed in a transition metal oxide substrate, for example, of titanium dioxide, by localized reduction by means of a concentrated energy source. Simultaneous scribing and localized, selective reduction of a transition metal oxide substrate in accordance with this phase of the invention, to produce a desired pattern of circuit paths, components, etc., may be carried out by employing a concentrated energy source which is exposed to preselected regions or parts of the transition metal oxide substrate. For example, referring to FIG. 6 titanium dioxide body 51 may have conductive circuit portions formed thereon with an electron beam, indicated schematically at arrowhead 53. Beam 53 directs energy on the surface of the titanium dioxide body through narrow slots in a mask 55. The beam bombards the body therebelow at predetermined localities to form the reduced zones 57 in accordance with any desired circuit path. It will be appreciated that the environment necessarily accompanying an electron beam includes vacuum conditions, for example, a pressure of about $10^{-5}$ mm. mercury absolute. By the use of the beam, any desired pattern can be directly produced on a body. The body is reduced only in those immediate areas where the beam contacts it, and thus paths of localized reduction in accordance with a desired circuit pattern may be formed in a one-step operation on the body. Subsequent removal of unwanted selectively reduced areas is made unnecessary.

A preferred technique omits the mask, utilizing an electron beam spaced from a transition metal oxide substrate a short distance and focused so that optimum beam resolution is obtained. Highly localized reduction is accomplished where the beam strikes the substrate and it is merely necessary to move the beam about over the face of the substrate in any desired pattern in order to accomplish localized reduction for a complete circuit "drawing."

In some instances, it will not be desired to plate the circuit pattern produced by bombardment with an electron beam. This is the case in those instances where the reduced zones defining the circuit pattern are sufficiently conductive to serve as conductive paths for the particular application involved. In many instances, however, it will be desired to plate the localized, reduced paths or portions, e.g. with copper, in order to produce highly efficient conductive paths on the dielectric substrate. A subsequent plating step may be performed to add a layer of a conductive metal which has good characteristics for purposes of welding. For example, a layer of nickel may be adhered to copper plated conductive paths by electroless plating from a standard nickel plating solution to provide an outer metallic layer which has good characteristics for welding.

Other means of reduction, both general and localized, may be resorted to. Thus, reduction of a transition metal oxide body may be accomplished by the interaction in air of the body with deposited aluminum on the surface thereof, for example at temperatures above about 200° C. (for a quite minor degree of reduction resulting in a partial defect structure only), preferably at about 800°–1000° C.; by concentrated energy sources other than electron beam, for example, an arc, laser, spark; or by a variety of means that will reduce the transition metal oxide body to provide comparatively metallic and conductive zones thereon. If it is desired that the selective reduction of a transition metal oxide body be accomplished in a localized manner, in accordance with a desired pattern, this may be accomplished by a variety of techniques, for example, by impinging heated hydrogen on the body in thin concentrated streams emitted from small nozzles; by vapor phase deposition of aluminum on the body, utilizing masking procedure, followed by reduction in air at temperatures of in excess of about 200° C., and preferably about 800°–1000° C.; or by tracing with an arc, laser, electron beam, etc. over the body in accordance with a desired pattern.

In accordance with the present invention, circuit paths, including various passive components, are provided in a transition metal oxide substrate. A fragment of such a substrate is illustrated in FIGS. 7 and 8, where it serves as a part of the composite body 59. Therein, the transition metal oxide substrate 61, for example made of titanium dioxide, is provided with a circuit path which consists of conductor paths 63, capacitor 65, resistor 67, upper surface contact 69, and lower surface contact 71. The substrate 61 overlies and is joined to semiconductor wafer 72 (see FIG. 8) which may be made, for example, of silicon or gallium arsenide.

The circuit path structure in FIGS. 7 and 8 may be formed by tracing the desired circuit pattern on the substrate 61 with an electron beam. A relatively conductive path is provided through the thickness of the substrate by drilling therethrough with the beam. The regions of the substrate bounding the hole so-formed are reduced by the beam to provide relatively metallic, conductive zones 73 which are like the zones formed on the substrate in other regions where it is contacted by the electron beam (see FIG. 8 for highly schematic view, exaggerated for purposes of illustration, of the relatively conductive zones 73). The capacitor 65 may be formed by manipulating the beam to trace one plate, skipping a small region, and then manipulating the beam to trace an opposite plate. The skipped region, between the plates, serves as the dielectric. The contacts 69 and 71, on the upper and lower surfaces of the substrate 61, respectively, are formed in generally circular configuration, or other desired pattern, by suitable manipulation of the beam. The resistor 67 may be formed by reducing the amount of the substrate's exposure to the beam substantially as it is traced to provide a portion of the circuit path which is comparatively less metallic and conductive than the other regions or zones autogenously formed by the beam. However, if the circuit path is to be plated, which is preferred for most applications, the resistor may be formed with the same degree of beam exposure and masked, as by application of a layer of polystyrene resin over the zone of the resistor to protect the resistor during plating.

After the comparatively conductive zones are autogenously formed by the beam in accordance with the desired circuit pattern of FIGS. 7 and 8, the substrate 61 is immersed in a plating solution, for example, in a standard electroless copper plating solution, and electroless plating is conducted in accordance with standard technique. A thin layer of copper is tightly bonded to the reduced, comparatively conductive and metallic autogenously formed zones 73. This layer is schematically illustrated in FIG. 8 by the thick, dark lines identified by the numeral 74. After the copper plating is completed, the body is immersed in a standard electroless nickel plating solution and electroless nickel plating is conducted in accordance with procedure well known in the art. When the desired thickness of nickel plated layer 75 is obtained, the substrate is removed from the plating solution and dried. In the event that a layer of masking material, for example, polystyrene resin, has been applied to overlie the resistor 67 prior to plating, it is removed by a suitable means; for example, if polystyrene was used as a masking material, it may be removed with the aid of acetone. The resulting product provides a circuit path, including passive components, carried by and tightly bonded to the dielectric substrate 61. Note that formation of the circuit path includes the important step of autogenously forming reduced, comparatively conductive and metallic regions from the transition metal oxide substrate 61 in accordance with the desired ultimate circuit pattern.

The substrate 61 is joined to the semiconductor wafer 72 by appropriate means, for example, by fusion between metallic members carried by the semiconductor wafer 72 and metallic regions, formed by reduction and subsequent plating, carried on the lower face of the substrate 61. Alternatively, aluminum may be deposited on metal plated regions carried by the substrate 61 and thereafter pressed into contact with semiconductor wafer 72 and heated, e.g. to about 500° C. If the semiconductor wafer is of silicon, for example, the resulting bond is enhanced by a eutectic formed between the silicon and aluminum. For greater detail regarding joining of the semiconductor material and the dielectric substrate, reference may be had to the said copending U.S. Pat. No. 3,390,012.

The semiconductor wafer 72 has the transistor 77 formed in it by procedure known in the art. Transistor 77 consists of emitter region 79, base region 81, and collector region 83. The contact 71 on the lower face of transition metal oxide substrate 61 engages appropriate circuitry in semiconductor wafer 72, e.g. it engages the collector region 83 to make good electrical contact therewith. It will be appreciated that the composite body 59 provides, in effect, a solid-state integrated composite circuit, composed both of circuitry carried in a substrate portion and in a semiconductor portion. The circuitry illustrated in FIGS. 7 and 8 is intended only as exemplary of how a solid-state integrated composite circuit might be provided, and, accordingly, should not be construed as in any way limiting the scope of the present invention.

An inductor may be formed in a transition metal oxide body, in accordance with the present invention, by exposure to a concentrated energy source in accordance with a predetermined pattern. For example, such an inductor is illustrated in FIG. 9. It comprises the spiral-shaped inductor coil 91, autogenously formed in transition metal oxide body 93, which may be made of iron oxide ($Fe_2O_3$), for example. Coil 91 is autogenously formed by an electron beam moved along the body 93 in a curved, convolutional path, winding inwardly and downwardly. The inductor coil 91 follows the conductive path 93a, schematically represented in FIG. 10. It will be appreciated that the trench cut during the formation of inductor coil 91 becomes deeper as the path of the coil winds inwardly. The degree of exposure to and/or intensity of the electron beam is increased during formation of the coil in order to deepen the trench in this manner. The path of the coil 91, which lies along the bottom of the trench so-formed, is preferentially plated with a metal by electroless plating technique, for example, it is preferentially plated with copper, followed by electroless plating with nickel, if desired. In this connection, it should be understood that the bottom region of the trench formed by the electron beam is comparatively more conductive than the sides of the trench, which are not so greatly reduced at the bottom. This makes preferential electroless plating possible in the desired regions. Moreover, masking may be used for the trench sides during the process of plating, if desired. The configuration of the coil is not limited to a curved, convolutional shape. Its spirals may be of a rectangular configuration or other desired configurations, accordingly, it will be understood that the word "spiral" is used herein to include such geometry, as well as the curved, convolutional configuration for which the term is often used. Although the inductor of FIG. 9 involves a coil in a deepening path, in many instances it is desirable that the path of the coil be of uniform depth. Accordingly, the inductor of this invention may take either form.

The selective reduction of the transition metal oxide may be conducted to vary the magnetic properties of the material, as well as conductive properties. For example, by varying the degree of reduction in an iron oxide body to a predetermined degree, desired magnetic properties may be obtained in a preselected region. Thus, an iron oxide body may be reduced only to the extent that a relatively minor amount of change occurs, resulting in a structure having only a minor oxygen defect; it may be reduced to a radically altered structure; or it may be reduced to various intermediate structures between these extremes. If desired, the selective reduction of a single body may be accomplished to varying degrees in accordance with a predetermined plan. For example, iron oxide may be quite mildly selectively reduced in a preselected region to change the material's magnetic properties to a desired degree in the preselected region. Thereafter, a subsequent reduction may be accomplished within a preselected part of the mildly reduced region to further vary the magnetic properties of the preselected part only. Such technique of successive reduction makes use of the various procedures described above, including the technique of localized reduction with an electron beam.

To illustrate alteration of magnetic properties, an iron oxide substrate may be mildly selectively reduced in a desired region to alter the magnetic properties of that region to a desired degree, e.g. by introduction of an oxygen defect structure. Thereafter, an inductor may be formed in the body by scribing with an electron beam as previously explained herein to define an inductor coil, the beam intensity and exposure being such that a greater degree of reduction is accomplished than in the first instance. On preferential plating of the more highly reduced inductor coil pattern, an inductor is formed. The inductor includes a core with magnetic properties of the desired degree, as determined by the preliminary selective reduction step. By such procedures, a pair of coils may be disposed in a substrate to define a transformer with a core having desired properties, for example, the desired permeability.

The change of magnetic properties referred to above may be applied to make various structures, for example, magnetic amplifiers, pulse generators, multivibrators, and semiconductor switching elements.

Magnetic properties which may be affected in various degrees and instances by reduction include the following: ferrimagnetism, paramagnetic susceptibilities, spontaneous magnetization, magnetization curves, saturation moments, magneto-crystalline anisotropy and shape-anisotropy.

Transition metal oxide bodies can be locally reduced to a high degree of resolution by the electron beam technique. For example, paths of about one mil depth and one mil width may be formed. By combining the electron beam with an electrical-optical lens system, even greater resolution may be obtained, e.g. resolution on the order of about one micron.

The formation of relatively metallized portions of a transition metal oxide body in accordance with the present invention provides a basis for the manufacture of many structures in which metal to ceramic bonds or seals are required. Exemplary of such structures is the relay header indicated generally at 101 in FIG. 11. This header is disclosed and claimed in the said copending U.S. Pat. No. 3,390,012. However, it was not appreciated pursuant to that invention that transition metal oxides could be selectively reduced to form such structure.

Referring to FIG. 11, the relay header 101 has four "feed-through" conductors 103 passing through its transition metal dielectric body 105 by means of apertures 107. The conductors 103 may be joined to the sides of the apertures by various means, for example, by soldering, using conventional soldering techniques. The apertures 107 are bounded by a thin outer annular jacket of copper plating, indicated at 109 in FIGS. 14 and 15. The copper plating 109 also extends outwardly a short distance on the upper surface and the lower surface of the disk 105 concentric about the apertures 107. Copper plating 111 surrounds, and is firmly adhered to, the disk 105 to provide a conductive outer rim. The structure just described will be better appreciated when a method of its manufacture, in accordance with the present invention, is described.

Referring to FIG. 12, a dielectric transition metal oxide disk 105, for example, of titanium dioxide, is drilled with four apertures 107 and disposed generally to receive the wires 103 which ultimately are to pass through the finished relay header (FIG. 11). Thereafter, the disk 105 is placed in an oven which has a hydrogen atmosphere and is maintained therein at a temperature of about 500° C. for approximately 30 minutes. The transition metal oxide disk is permitted to cool and is removed from the oven. Body 105 is found to be partially reduced in zones 108 immediately adjacent its exposed surfaces, which include the exposed bounding surfaces of apertures 107 and of the outer rim of the disk.

Thereafter, the disk 105 is processed to shear off or otherwise remove the partial reduction zones 108 on the upper and lower faces of the disk. The resulting body is then immersed in a standard electroless copper plating solution at about 25° C. for about 45 minutes. On removal of the body, copper is found to have selectively plated on the partially reduced zones, which plating is indicated at 109 and 111 by heavy black lines in FIGS. 14 and 15. If desired, the body may again be immersed in a plating solution, this time of nickel, and electroless plating conducted to apply a nickel layer. Such application of a nickel layer is particularly desirable if any welding is to be conducted on the exposed metal of the end product.

After plating is completed, the conductors 103 are inserted into the metalized apertures 107 and soldered, as at 113 (see FIGS. 11 and 15), to secure and seal them tightly in their passage through the header disk 105. The resulting article is the relay header indicated generally at 101 in FIGS. 11 and 15, previously described. Such a header may be greatly miniaturized in comparison to headers of the prior art. Prior art headers are conventionally based on metal-glass assemblies and are necessarily unduly large for many applications since the metal thickness must be substantial to provide strength and the glass comparatively thick to provide insulation. Since ceramics have greater breakdown resistance with regard to voltage and temperature than does glass, thinner sections of a ceramic, specifically transition metal oxide, can advantageously be utilized for this purpose. Transition metal oxide ceramics, having a greater strength than glass, advantageously do not require discrete metal structural supports, as does glass. These factors also contribute to miniaturization.

The header 101, with its firmly adhered copper (and nickel, if desired) plated layer and with its high dielectric strength transition metal oxide body, e.g. titanium dioxide, provides strength, high integrity sealing, and insulation and yet permits miniaturization beyond that permitted by present comparable glass to metal sealing structures.

Further, the formation of integral metalized surfaces on the transition metal oxide disk 105 avoids the necessity of applying bonding interlayers between the feed-through conductors and a ceramic disk which might be used in accordance with prior art technique rather than in accordance with this invention. To use a ceramic disk for this purpose, without the benefit of the present invention, would cause problems such as exposing the disk to high processing temperatures required for causing intimate interaction between the interlayer introduced between the feed-through conductor and the transition metal oxide ceramic disk. At such elevated temperatures dimensional control of the interlayer, which is at least in the plastic state, is difficult and the ceramic is exposed to the dangers of thermal shock. In contrast, the present invention permits using low temperatures for reduction, as above described, and also the use of a low melting point solder.

The metal plating, the metalized portion of the ceramic and the solder surrounding the lead are believed to act as a buffer or a thermal expansion joint which permits selection of a wide variety of materials for the leads and transition metal oxide ceramic disk without requiring close matching of coefficients of thermal expansion as heretofore required in metal to glass arrangements.

FIG. 16 is a fragmentary view, in cross section, through a multi-level board generally indicated by numeral 122. The illustrated portion 122 serves as a through-plated hole interconnector which connects spaced conductors or conductive layers 128 on different levels. The conductive layers 128 are separated by dielectric sheets or layers 123, made of a transition metal oxide, for example, of titanium dioxide. Layers 123 are firmly adhered to layers 128. The surfaces of the dielectric layers defining hole 125 are reduced by the technique previously described herein to provide a relatively metallic transition zone 127. Copper plating 129 is firmly adhered to zone 127 as well as to the ends of the spaced conductive layers 128. Spaced conductive layers 128, it will be observed in FIG. 16, are penetrated by a through-drill hole 125 which is bounded by an outer coating 130 of nickel which overlies copper plating 129.

The advantages of the structure of FIG. 16 will be more readily understood on considering its method of manufacture. The body portion 122, carrying the space conductive layers 128 at different levels, is drilled through perpendicular to said conductive layers so that the hole 125 passes through the conductors. The body 122 is then placed in a furnace in a hydrogen atmosphere and maintained therein at a temperature of approximately 800° C. for about 15 minutes. The body 122 is allowed to cool and is removed from the oven. At this time, the relatively reduced transition zone 127, which extends annularly inwardly from the surface boundaries of the hole 125, will have formed. The body 122 is next disposed so that the hole 125 is immersed in an electroless copper plating solution. Electroless plating is then conducted to apply the copper plate 129. The resulting copper plate 129 is adhered firmly to the reduced transition zone 127 and to the clearances between the transition metal oxide and conductive layers 128 adjacent where the lateral portions intersect the hole 125. Thus, a good connection is made with plating support firmly adhered to the spaced conductors (i.e., the conductive layers) and making bonded contact with the plated hole. It will be noted that a three-planar support is effectively provided for the conductors. Preferably, nickel plating is finally applied by electroless plating technique to produce an outer layer of nickel 130 of desired thickness.

It should be appreciated that the hole 125 of the structure 122 of FIG. 16 could be made to extend partially into or entirely through the body 122 by the electron beam or concentrated energy source technique previously described herein.

The transition metal oxide bodies utilized in the present invention may be made in various ways. For example, titanium dioxide particles may be molded, as by a conventional press, into a desired shape and the resulting particle mass fired at 1500° C. in oxygen. The resulting ceramic body has a resistivity on the order of $10^{13}$ ohm-cm. The surface regions of such a body, e.g. a circuit board substrate, may be reduced with an electron beam by the techniques previously described herein to comparatively quite low resistivity. Thus, resistivities on the order of $10^{-2}$–$10^{-3}$ ohm-cm. may be obtained in desired regions of a titanium dioxide circuit board or other titanium dioxide body which resistivity is intermediate that of the titanium dioxide and pure titanium.

The preferred transition metal oxide for forming circuit boards and like structures is titanium dioxide, but the other transition metal oxides are usable for circuit boards and/or other structures in certain applications. Accordingly, the present invention pertains to bodies of oxides of the metals ranging from scandium through zinc in the Periodic Table, specifically, to the oxides of scandium, titanium, vanadium, chromium, manganese, iron, cobalt, nickel, copper and zinc. It will be noted that these transition metals possess the common characteristics of having partly filled 3 d. shells. Preferred materials are $TiO_2$, $Fe_2O_3$, $NiO$, $Cr_2O_3$, and $V_2O_5$.

When titanium dioxide is the material of construction, partially reduced regions will not directly plate readily with nickel by electroless technique. Copper preferentially plates electrolessly on such partially reduced regions. Accordingly, electroless plating of copper may be conducted, and thereafter, if desired, nickel may be electrolessly plated over the copper. If reduction of the titanium dioxide is substantially completed (i.e. reduction all the way to $Ti_2O_3$), direct electroless nickel plating can be conducted. Iron oxide substrates can be directly electrolessly nickel plated, even when the zones of reduction involved are comparatively mildly reduced.

An example of an electroless plating solution for copper, which may be utilized when copper plating is called for herein, is as follows: One liter of a water solution containing 35 grams of copper sulphate, 20 grams of sodium hydroxide, and 170 grams of rochelle salt are mixed with 200 ml. of a 37% (by weight) solution of formaldehyde. The resulting mixture provides an electroless copper plating solution in which reduced zones of a transition metal oxide body may be preferentially plated, e.g. at about 25° C. Plating time ranges around one-half to two hours. Plating should be conducted while the solution is fresh.

An example of an electroless plating solution for nickel, which may be utilized when nickel plating is called for herein, is as follows: The initial solution contains 3% $NiCl_2 \cdot 6H_2O$, 1% $NaH_2PO_2 \cdot H_2O$, 5% ammonium chloride, 10% sodium citrate, and 81% water (all percentages being by weight). To a hundred volumes of the foregoing solution, five volumes of ammonium hydroxide are added and the solution is heated to 95° C., at which time five more volumes of ammonium hydroxide are added. The item to be plated is immersed in the solution, which is maintained at about 95° C. Every six minutes, two volumes of ammonium hydroxide are added to replace loss. Typical plating time (e.g. for one-quarter mil layer) is about one-half hour.

The phrase "reducing environment," as used herein, including the claims, is intended to refer to an environment in which reduction may be effectively accomplished. Since vacuum conditions provide such an environment, it is intended that vacuum conditions be included within the meaning of the phrase "reducing environment" along with the many other conditions supporting reduction.

The term "autogenously," as used herein, including the claims, is intended to convey the concept that a zone, portion, etc. "originates within or is derived from the same individual" (Webster's Seventh New Collegiate Dictionary), i.e., derived from the same item referred to as having portions "autogenously" formed therefrom.

To summarize briefly, it has been seen that the present invention provides a transition metal oxide body, of a generally ceramic, dielectric character, having autogenously formed comparatively conductive portions. The comparatively conductive portions may be disposed in a desired pattern, e.g. to define circuitry. Circuit boards, headers, interconnectors, and various solid-state circuits may be made utilizing the present invention. The present invention depends upon the important step of selectively reducing a zone of a transition metal oxide body so that the zone is made comparatively (i.e. compared to the unreduced portions) conductive.

Having described the invention in connection with certain specific embodiments thereof, it is to be understood that further modifications may now suggest themselves to those skilled in the art and it is intended to cover such modifications as fall within the scope of the appended claims.

What is claimed is:

1. A process of preparing a transition metal oxide body having a comparatively conductive portion comprising: subjecting a zone of the transition metal oxide body to be rendered comparatively conductive to a concentrated, localized energy in a reducing atmosphere of either hydrogen or inert gas for a period of time at elevated temperature and under substantial vacuum; the energy, the reducing atmosphere, the period of time, and the temperature being selected to effect only partial reduction of said transition metal oxide and effect in said zone a resistivity intermediate the resistivity of the original transition metal oxide and resistivity of the metal from which the transition metal oxide body was formed; the transition metal oxide body being formed of titanium dioxide $TiO_2$, chromium oxide $Cr_2O_3$, or vanadium pentoxide $V_2O_5$.

2. The process of claim 1 wherein said body is made of titanium dioxide.

3. The process of claim 1 wherein said body is made of chromium oxide $Cr_2O_3$.

4. The process of claim 1 wherein said body is made of vanadium pentoxide $V_2O_5$.

5. The process of claim 1 wherein said localized concentration of energy is produced by an electron beam.

6. The process of claim 5 in which the degree of reduction of said zone is varied at predetermined locations on its pattern by varying the severity of reduction conditions over said zone.

7. The process of claim 5 in which said zone is contiguous with the surface of said body.

8. The process of claim 1 in which said reduction is accomplished in a hydrogen atmosphere at temperatures substantially elevated above room temperature.

9. The process of claim 1 in which said reduction is accomplished in an inert gas atmosphere at temperatures substantially elevated above room temperature.

10. The process of preparing a transition metal oxide dielectric body having comparatively conductive portions comprising:
  (a) subjecting in the transition metal oxide, a zone to be rendered comparatively conductive to a concentrated, localized energy in a reducing atmosphere of either hydrogen or inert gas for a period of time at elevated temperature and under substantial vacuum; the energy, the reducing atmosphere, the period of time, and the temperature being selected to effect only partial reduction of said transition metal oxide and effect in said zone a resistivity intermediate the resistivity of the original transition metal oxide and resistivity of the metal from which the transition metal oxide was formed; the transition metal oxide body being formed of either titanium dioxide $TiO_2$, chromium oxide $Cr_2O_3$, or vanadium pentoxide $V_2O_5$; and
  (b) selectively adhering a metallic conductor to at least part of said comparatively conductive zone.

11. The process of claim 10 wherein said metal comprises at least a major proportion of either nickel, copper, or discrete layers of each.

12. The process of claim 10 in which said adhering is accomplished by plating said metallic conductor on said comparatively conductive zone.

13. The process of claim 10 wherein a portion of said comparatively conductive zone is removed to leave said comparatively conductive zone only at a desired location on said body before adhering a metallic conductor to the portion of said comparatively conductive zone remaining on said body.

14. A body comprising a transition metal oxide portion of either titanium dioxide $TiO_2$, chromium oxide $Cr_2O_3$, or vanadium pentoxide $V_2O_5$ having a comparatively conductive zone integral with, and autogenously formed from, said transition metal oxide portion therein, said comparatively conductive zone consisting essentially of said transition metal oxide which has been at least partially reduced and which has a resistivity intermediate said transition metal oxide and the metal from which the transition metal oxide was formed.

15. The body of claim 14 wherein said transition metal oxide is titanium dioxide.

16. The body of claim 14 wherein said transition metal oxide is chromium oxide $Cr_2O_3$.

17. The body of claim 14 wherein said transition metal oxide is vanadium pentoxide $V_2O_5$.

18. The body of claim 14 in which said comparatively conductive zone has variable degrees of conductivity, in accordance with a desired pattern of variation, effected by varying the severity of the reducing conditions and by adhering a metal conductor to at least a portion of said comparatively conductive zone.

19. The body of claim 14 wherein said comparatively conductive zone includes a spiral pattern defining a coil and effects a solid state inductor.

20. The inductor of claim 19 further comprising metal plating on said coil.

21. A circuit board comprising:
  a reducible transition metal oxide substrate of either titanium dioxide $TiO_2$, chromium oxide $Cr_2O_3$, or vanadium pentoxide $V_2O_5$ having relatively conductive circuit portions autogenously formed therein by partial reduction of said substrate and having a resistivity in said relatively conductive circuit portions intermediate the resistivity of the original transition metal oxde and the resistivity of the metal from which said transition metal oxide was formed.

22. The circuit board of claim 21 in which said transition metal oxide is titanium dioxide.

23. The circuit board of claim 22 further comprising copper plate overlying said conductive circuit portions, the nickel plate overlying said copper plate.

24. The circuit board of claim 21 further comprising a metal adhered to at least a part of said relatively conductive portions.

25. The circuit board of claim 21 wherein said conductive circuit portions comprise a part that has a comparatively high conductivity and an autogenously formed part contiguous therewith that has a comparatively low conductvity, whereby a resistor is defined on said relatively conductive circuit portions.

26. The circuit board of claim 21, wherein said circuit portions include two spaced-apart conductive zones separated on said substrate by unreduced reducible transition metal oxide therebetween, whereby a capacitor is defined on said substrate with the two zones as plates and with unreduced reducible transition metal oxide separating them as dielectric.

References Cited

UNITED STATES PATENTS

| | | | |
|---|---|---|---|
| 2,465,713 | 3/1949 | Dimmick | 117—93.3 X |
| 3,056,881 | 10/1962 | Schwarz | 117—212 |
| 3,354,064 | 11/1967 | Letter | 117—93.3 X |

OTHER REFERENCES

Brunetti and Curtis: "Printed Circuit Techniques," NBS Circular 468, Nov. 15, 1947, p. 20.

ALFRED L. LEAVITT, Primary Examiner

A. GRIMALDI, Assistant Examiner

U.S. Cl. X.R.

29—625; 117—93.3